Nov. 14, 1967  Z. BERK  3,352,693
CONCENTRATION OF THIXOTROPIC COMPOSITIONS
Filed Oct. 31, 1963
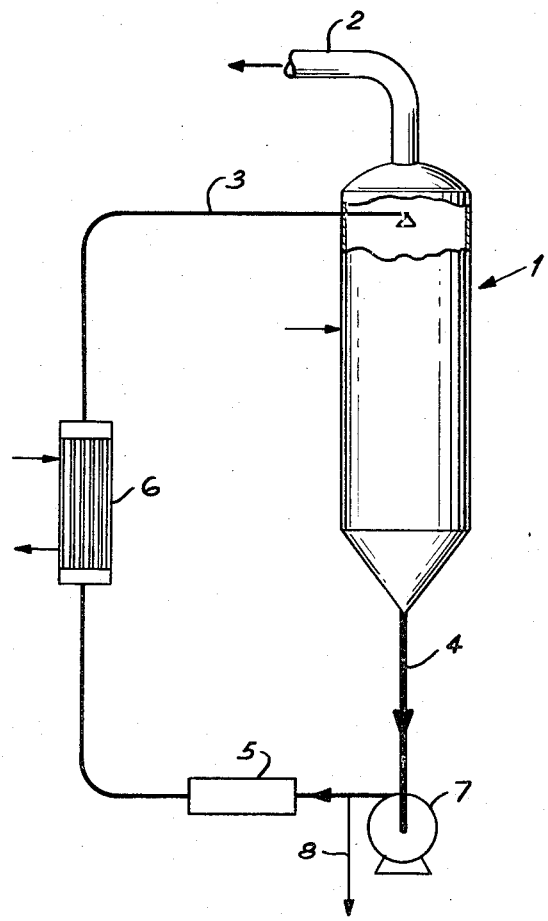
INVENTOR.
ZEKI BERK
BY
ATTORNEY United States Patent Office 3,352,693
Patented Nov. 14, 1967

3,352,693
CONCENTRATION OF THIXOTROPIC
COMPOSITIONS
Zeki Berk, Haifa, Israel, assignor to Technion Research
and Development Foundation Ltd., Haifa, Israel, a corporation of Israel
Filed Oct. 31, 1963, Ser. No. 325,834
3 Claims. (Cl. 99—205)

ABSTRACT OF THE DISCLOSURE

A method of concentrating citrus juice by means of ultrasonic high frequency vibration which eliminates or minimizes the likelihood of impairment of flavor.

---

The present invention concerns a method and apparatus for the concentration of thixotropic compositions, i.e. compositions whose viscosity is reduced by the application of shearing forces. In the following description the invention will be described with particular reference to the concentration of vegetable extracts, it being understood that the invention is not limited to the concentration of said extracts and is applicable to any thixotropic composition capable of being concentrated.

It is known that the viscosity of vegetable concentrates such as for example fruit juice is a limiting factor in any further concentration. Thus, for example, in the case of orange juice, it is difficult to concentrate above a soluble solid material content of 65 to 67%. Beyond this concentration the higher viscosity reduces the rate of heat transfer to such an extent that scorching and browning becomes inevitable.

In accordance with the invention a thixotropic composition is concentrated by a process which comprises the steps of submitting the composition to an ultrasonic treatment and to solvent evaporation.

Where the concentration is effected in stages it is possible in accordance with the invention to precede each individual evaporation stage by an ultrasonic treatment. The invention may also be carried out by continuously recycling the product withdrawn from the evaporator back through the ultrasonic treatment unit into the evaporator. In this manner the concentration is increased gradually up to the desired level.

In accordance with the invention fruit juices of a concentration of 75° to 80° Brix can be prepared. The preparation of juices or rather purees of such a high concentration is very desirable since at this level of concentration no special measures for preservation such as pasteurization or freezing have to be taken. All that is required with such a product is to store it under refrigeration so as to prevent non-enzymatic browning. Such a degree of concentration could hitherto not be achieved even with modern evaporators containing heat exchangers designed to cause a high turbulence of the concentrate, in spite of the fact that in such evaporators the apparent viscosity of the heated medium is reduced due to high shear-rate. Moreover, where hitherto multi stage concentration was practised in short-time continuous evaporators, the retention time in the final stages necessary for obtaining a high degree of concentration was unduly long, mainly because of the poor heat conductivity of the highly viscous film of concentrate.

The highly concentrated juices obtained in accordance with the present invention are considerably less viscous than would be the case if concentrates of the same degree of concentration were prepared in a conventional manner, and this state of comparatively reduced concentration appears to be permanent. Thus, for example, the viscosity of a 70° Brix orange juice concentrate prepared in accordance with the invention was only 1.5 times that of the original 60° Brix concentrate. Against this, the viscosity of a 70° Brix concentrate obtained by evaporation without ultrasonic treatment was almost 8 times that of this original 60° Brix concentrate.

The invention also consists in an apparatus for the concentration of a thixotropic composition comprising means for the ultrasonic treatment of the composition, an evaporator, and means for conducting the composition from said ultrasonic treatment means to the evaporator.

The invention is illustrated by way of example only in the accompanying drawing which is a diagrammatic representation of a device according to the invention.

The device here illustrated comprises an evaporator 1 having an adapter 2 for connection to a condenser, an inlet 3 for feeding the composition to be concentrated and outlet 4 for the discharge of the concentrated product. The apparatus further comprises an ultrasonic treatment unit 5, a heater 6, a pump 7 and an outlet 8 for the take-off of the final product. During operation, the treated composition is circulated continuously from the evaporator through the ultrasonic treatment unit 5, the heater 6 back into the evaporator and in this manner a gradual concentration takes place. As soon as the final degree of concentration is reached the product is discharged through outlet 8.

The invention is further illustrated by the following two working examples. In these examples the relative viscosity measurements were effected by comparing the time of flow in a No. 400 Oetwald Pipette. Where concentrates of different degrees of concentration were compared, correction was made for the differences in specific gravity.

Example 1

50 g. of commercial Shamouti orange juice concentrate with a soluble solids content of 60° Brix, was subjected to ultrasonic waves with a frequency of 20,000 cycles per second. The ultrasonic generator had a power output of 60 watts. The relative viscosity of the sample decreased as follows:

| Period of treatment minutes: | Relative viscosity |
|---|---|
| 0 | 100 |
| 2 | 85 |
| 4 | 64 |
| 7 | 53 |
| 12 | 51 |
| 15 | 26 |

This example illustrates the very pronounced lowering of the viscosity by a suitable ultrasonic treatment. The applicability of this phenomenon in the concentration of orange juice is illustrated in the following Example 2.

Example 2

A commercial sample of Shamouti orange juice concentrate, as described in Example 1, was subjected to ultrasonic treatment for ten minutes by means of the apparatus described in Example 1, and then concentrated, under reduced pressure to a soluble solids content of 63° Brix. The material was given another ten minutes of ultrasonic treatment and further concentrated to 70° Brix. The viscosity of this 70° Brix concentrate was only 150% of that of the original 60° Brix concentrate. The viscosity of a 70° Brix concentrate obtained without ultrasonic treatment was 700% that of the original 60° Brix concentrate. The sample concentrated in accordance with the invention was capable of further concentration without scorching and browning.

What is claimed is:
1. A method of concentration of a thixotropic solution which comprises the steps passing a body of the said solution through a zone, subjecting said solution in said zone to ultrasonic vibration sufficient to decrease the viscosity of said body, passing said treated body through a heating zone to raise the temperature thereof sufficiently to produce vapors, then passing said heated body through an evaporator to remove such vapors and to concentrate said solution without scorching thereof.

2. A method according to claim 1 characterized in that said steps are in a closed cycle of circulation to produce a final concentrated liquid body.

3. Apparatus for the concentration of a thixotropic solution comprising an ultrasonic treatment unit, a connection thereto for introduction of a body of said solution to be concentrated, a heater for said body, an outlet from said unit connected to the inlet of said heater, an evaporator, a connection from said heater outlet to said evaporator, pump means for circulating said solution through said apparatus, and an outlet from said evaporator for the concentrated solution.

References Cited

UNITED STATES PATENTS 2,969,111   1/1961   Bocagnano _____ 159—1
3,209,812  10/1965   Sargent _____ 99—199

A. LOUIS MONACELL, *Primary Examiner.*

HYMAN LORD, *Examiner.*

M. VOET, *Assistant Examiner.*